(12) United States Patent
Suzuki

(10) Patent No.: US 7,016,267 B2
(45) Date of Patent: Mar. 21, 2006

(54) MAGNETOOPTICAL RECORDING APPARATUS HAVING RETREATABLE MAGNETIC HEAD

(75) Inventor: Kazunori Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 10/231,277

(22) Filed: Aug. 30, 2002

(65) Prior Publication Data

US 2003/0058750 A1    Mar. 27, 2003

(30) Foreign Application Priority Data

| Sep. 3, 2001 | (JP) | ............................. 2001/265897 |
| Apr. 11, 2002 | (JP) | ............................. 2002/109283 |
| Apr. 23, 2002 | (JP) | ............................. 2002/120743 |

(51) Int. Cl.
| G11B 11/10 | (2006.01) |
| G11B 5/48 | (2006.01) |
| G11B 5/58 | (2006.01) |
| B29C 45/14 | (2006.01) |

(52) U.S. Cl. .................................................. 369/13.17
(58) Field of Classification Search ............. 369/13.17, 369/13.21, 13.2, 13.12; 360/244.1
See application file for complete search history.

(56) References Cited

U.S. PATENT DOCUMENTS

| 4,756,967 A | 7/1988 | Hashimoto et al. | ......... 428/336 |
| 4,910,068 A | 3/1990 | Takagi et al. | ................ 428/141 |
| 4,913,933 A | 4/1990 | Kasanuki et al. | ............ 427/129 |
| 5,000,995 A | 3/1991 | Kishi et al. | ..................... 428/64 |
| 5,055,351 A | 10/1991 | Fujimoto et al. | ............ 428/336 |
| 5,115,363 A * | 5/1992 | Khan et al. | ............... 360/245.3 |
| 5,140,938 A | 8/1992 | Kasanuki et al. | ............ 118/718 |
| 5,299,080 A * | 3/1994 | Mizuno et al. | ........... 369/13.17 |
| 5,360,969 A | 11/1994 | Suzuki | ........................ 235/479 |
| 5,657,300 A * | 8/1997 | Takahashi | ................ 369/13.17 |
| 5,677,897 A * | 10/1997 | Anada et al. | ............. 369/13.21 |
| 5,682,280 A * | 10/1997 | Takahashi et al. | ........ 369/13.17 |
| 6,028,741 A * | 2/2000 | Kazama | .................... 369/13.17 |
| 6,031,693 A * | 2/2000 | Takahashi et al. | ........ 369/13.17 |
| 6,067,207 A * | 5/2000 | Kurita | ..................... 369/13.17 |
| 6,493,188 B1 * | 12/2002 | Tokisue et al. | ........... 360/245.1 |

FOREIGN PATENT DOCUMENTS

EP    0640965 A1 *  3/1995

* cited by examiner

*Primary Examiner*—George J. Letscher
*Assistant Examiner*—Christopher R. Magee
(74) *Attorney, Agent, or Firm*—Fitzpatrick, Cella, Harper & Scinto

(57) ABSTRACT

A magnetooptical recording apparatus that records information by applying a magnetic field from a magnetic head while irradiating a light beam onto a magnetooptical disk from an optical pickup. The apparatus includes an optical pickup, a magnetic head having a slider that moves in a radial direction of the magnetooptical disk together with the optical pickup and is abutted against a recording surface of the magnetooptical disk and first and second elastic members that support the magnetic head.

2 Claims, 14 Drawing Sheets

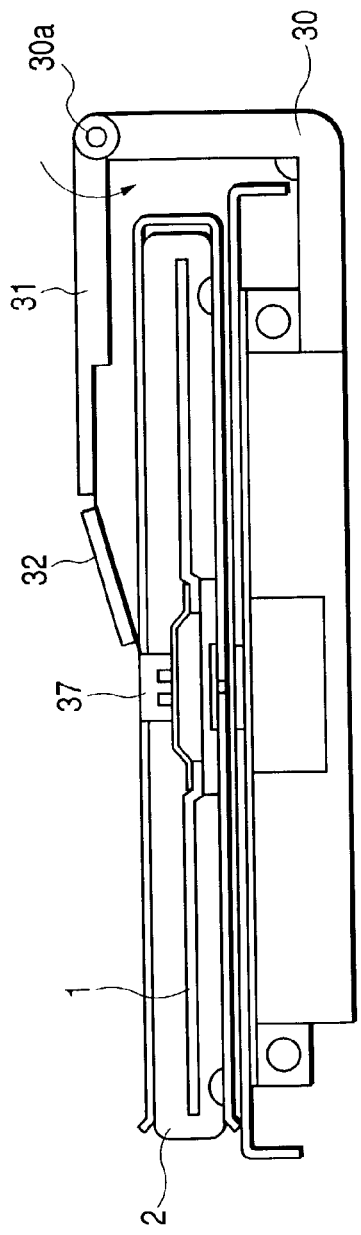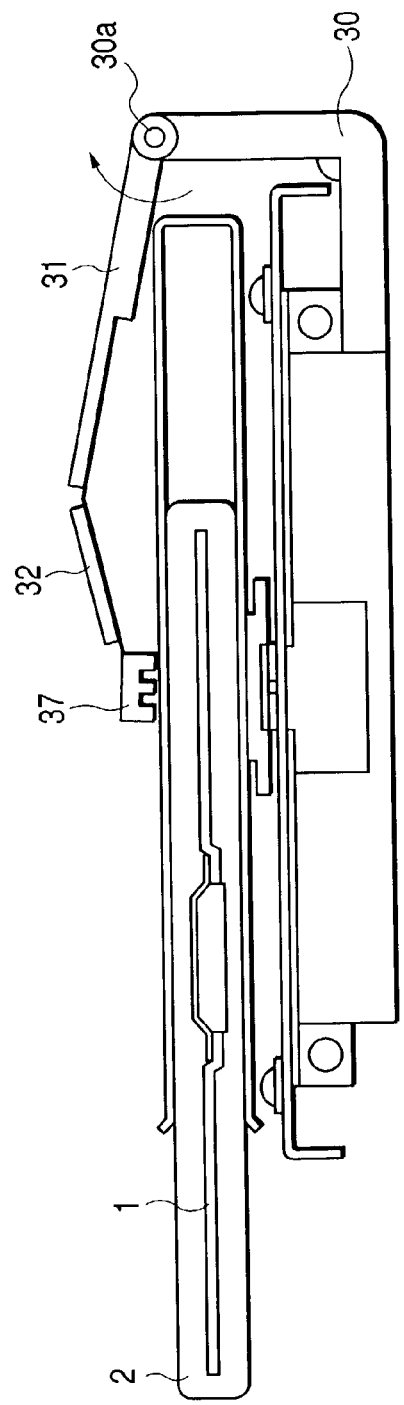
FIG. 1 PRIOR ART
FIG. 2 PRIOR ART

MAGNETOOPTICAL RECORDING APPARATUS HAVING RETREATABLE MAGNETIC HEAD

BACKGROUND OF THE INVENTION

1. Field of the Invention

The present invention relates to a magnetooptical recording apparatus that records information on a magnetooptical disk, and more particularly to an improvement in a magnetic head that slides on the magnetooptical disk.

2. Related Background Art

Up to now, there has been known a magnetooptical disk recording/playback apparatus that records or plays back information with respect to a magnetooptical disk having a magnetooptical recording layer which is formed of a vertically magnetized film as a recording medium. The recording system of the magnetooptical disk recording/playback apparatus is roughly classified into a magnetic field modulation system and a light modulation system. Of those systems, in the magnetic field modulation system, an orientation of an external magnetic field is reversed in accordance with information to be recorded while irradiating a laser beam having a desired intensity, to thereby record information.

In recent years, this magnetic field modulation system is applied to a portable product such as an MD (mini disk) or a digital disk cam coder (movie) device as an over-write recording system, that is, a recording system that is rewritable directly without an erasing process.

In the magnetic field modulation system, a magnetic field is applied the optical axis of a light spot that is irradiated from an objective lens of an optical pickup which opposes a magnetic head through the magnetooptical disk arranged therebetween. Therefore, when recording/playback operation is conducted on the disk received in a cartridge as in the MD, there is required a mechanism that opens a shutter of the cartridge and moves up and down the magnetic head with respect to a disk recording surface. The ascending and descending operation, that is, the vertical movement from the disk recording surface that is received in the cartridge by an amount corresponding to the thickness of the cartridge is required for the magnetic head. The amount of the vertical movement thus required is a factor that limits thickness reduction of the apparatus and the like, and a height of from a movable support point of the magnetic head to the magnetooptical disk recording surface and a length of the magnetic head support portion adversely affect the disk surface deflection as a displacement in the tangential direction.

Hereinafter, a conventional magnetooptical playback apparatus employing the magnetic field modulation system will be described with reference to FIGS. 1 and 2. FIG. 1 is a cross-sectional view showing a state in which a magnetic head 37 is in contact with a magnetooptical disk 1 which is received in a cartridge 2, and FIG. 2 is a cross-sectional view showing a state in which the cartridge 2 is discharged. In the conventional apparatus, a magnetic head movable arm 31 is rotatably supported about a rotating portion 30a of a support arm 30 as a center. At the leading portion of the magnetic head movable arm 31, the magnetic head 37 comes into contact with the magnetooptical disk 1 with a constant pressure by means of a leaf spring 32.

In this example, as shown in FIG. 1, in a recording operation, the magnetic head movable arm 31 is rotated about the rotating portion 30a as a center by a drive means (not shown) and is brought into contact with the magnetooptical disk 1 with a constant pressure. On the other hand, as shown in FIG. 2, in the discharge operation of the cartridge 2, the magnetic head movable arm 31 rotates clockwise about the rotating portion 30a as a center so that the magnetic head 37 is escaped upward. Also, when the cartridge 2 is loaded within the apparatus, the magnetooptical disk is positioned by a magnet chucking means using a turntable and rotates at a desired rotating speed. In this example, the magnetic head 37 and the optical pickup are so disposed as to oppose each other through the magnetooptical disk 1 arranged therebetween. The magnetic head 37 and the optical pickup are adjusted in position so that the optical axis of the light beam which is irradiated from the objective lens is made to coincide with the intensity center of a magnetic field which is applied from the magnetic head 37, and thereafter fixed to each other by a screw.

The magnetic pole core of the magnetic head 37 used in the magnetic field modulation system is generally made of Mn—Zn ferrite and relatively low in magnetic permeability. Therefore, in order to generate a magnetic field sufficient to conduct direct over-write, a large current needs to flow in a coil which is wound on the magnetic pole core. Also, with regard to the magnetic pole of the magnetic head 37, the recent trend is to reduce the sectional area of the magnetic field generation surface so as to allow adaptation to high-frequency recording, and to reduce an inductance in order to reverse the magnetic field at a high frequency of several tens MHz. It is important to make the center of the magnetic field intensity of the small magnetic head 37 and the center of the light spot from the optical pickup 2 coincide with each other with high precision to perform a recording and playback operation in a satisfactory manner.

However, in the above-mentioned conventional recording apparatus, in the case where the surface deflection, eccentricity or the like occurs in the magnetooptical disk 1, the center of the irradiation beam from the optical pickup and the magnetic pole core of the magnetic head 37 are displaced with respect to each other in the radial direction and in the tangential direction. In the case of radial displacement, that is, the disk eccentricity, since the magnetic pole core size is determined taking into account a standard prescribed amount of disk eccentricity, the core size depends on the amount of eccentricity. However, regarding the amount of eccentricity in the tangential direction, the cross-sectional area of the core configuration must be made as small as possible in consideration of high-frequency recording, so that the core size becomes necessarily small. For that reason, when the disk surface deflection or the like occurs, it is impossible to obtain a favorable positional relationship between the light spot and the magnetic field generation region which is generated from the magnetic pole core of the magnetic head 37, particularly in the tangential direction.

Under the above-mentioned circumstances, in the conventional suspension structure, in consideration of a height arrangement that would prevent the collision of the magnetooptical disk 1 with the magnetic head 37 when loading and unloading the magnetooptical disk 1, the magnetic head 37 is rotated with a desired position as the movable fulcrum 30a of the magnetic head. In this structure, an angle formed by a straight line that connects the center point of the magnetic head 37 and the rotating point 30a with respect to the disk surface becomes large. When the angle is large, the magnetic head 37 is largely displaced in the tangential direction due to the occurrence of the disk surface deflection, that is, the variation in the height of the disk.

FIG. 3 is a view showing a state in which the magnetic head is displaced in the tangential direction due to the disk surface deflection. It is apparent that the amount of displacement becomes larger in proportion to a distance of from the rotating portion 30a of the magnetic head movable arm 31 to the magnetooptical disk surface. Therefore, the height distance must be made as small as possible, but in the conventional structure, because the magnetic head is so structured as to be supported by the movable arm, the height of the arm is required to some degree and thus the displacement of the magnetic head in the tangential direction cannot be avoided.

On the other hand, in recent years, reduction in the diameter of the optical disk has advanced, and there is a trend toward increased information recording density per square inches. Moreover, the size of the magnetic pole core of the magnetic head 37 is made increasingly smaller. Taking the above situation into consideration, it is desirable to reduce not only the displacement in the radial direction but particularly in the tangential direction.

SUMMARY OF THE INVENTION

The present invention has been made in view of the above-mentioned problems with the conventional art, and therefore an object of the present invention is to provide a magnetooptical recording apparatus in which the displacement of a magnetic head in the tangential direction can be suppressed and which can also be reduced in size.

One of the structures of the present invention which achieve the above-mentioned object is stated below.

That is, according to the present invention, there is provided a magnetooptical recording apparatus which records information by applying a recording magnetic field from a magnetic head while irradiating an light beam onto a magnetooptical disk from an optical pickup, the apparatus comprising:

an optical pickup;

a magnetic head having a slider that moves in a radial direction of a magnetooptical disk together with the optical pickup and is abutted against a recording surface of the magnetooptical disk; and first and second elastic members that support the magnetic head, wherein a base end portion of the first elastic member is fixed to a given position of a substrate that supports the magnetic head, the second elastic member is bent with respect to the first elastic member, and a base end portion of the second elastic member is fixed to the slider, and a displacement of the magnetic head in the tangential direction due to vertical displacement of the magnetooptical disk is canceled by displacements which are respectively caused by the first and second elastic members and act in mutually opposite directions.

BRIEF DESCRIPTION OF THE DRAWINGS

FIG. 1 shows a magnetooptical recording/playback apparatus in a conventional example.

FIG. 2 shows a state of the apparatus shown in FIG. 1 in which a cartridge is discharged.

DETAILED DESCRIPTION OF THE PREFERRED EMBODIMENTS

Hereinafter, a description will be given in more detail of preferred embodiments of the present invention with reference to the accompanying drawings.

(First Embodiment)

Figure 3:
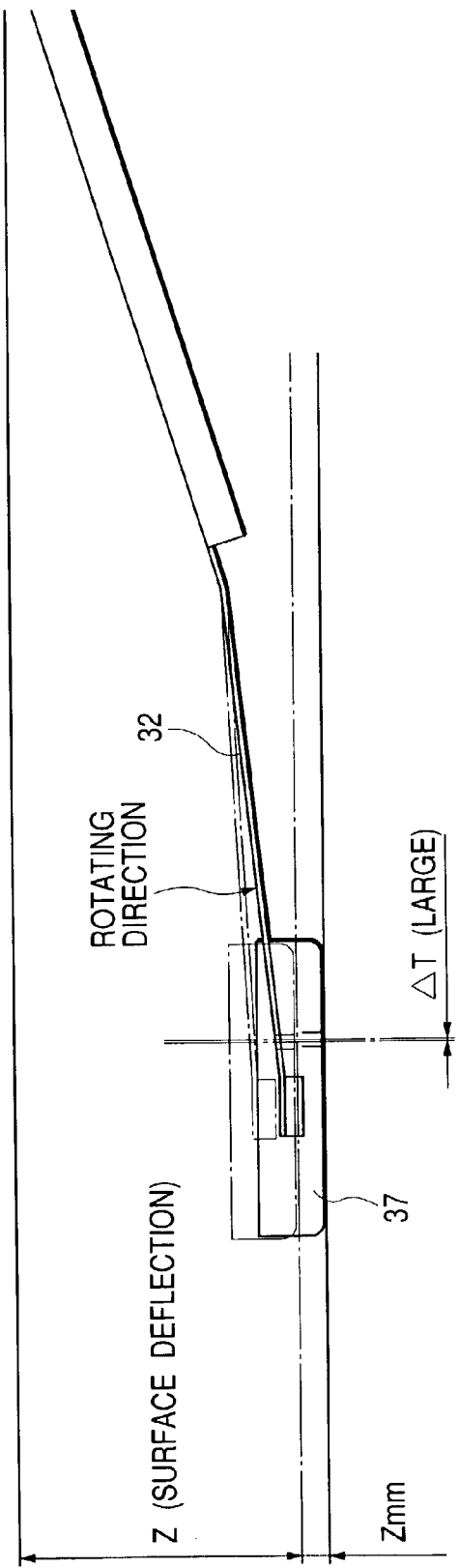
FIG. 3 shows a displacement of a magnetic head in the tangential direction due to surface deflection of a disk.
Figure 4:
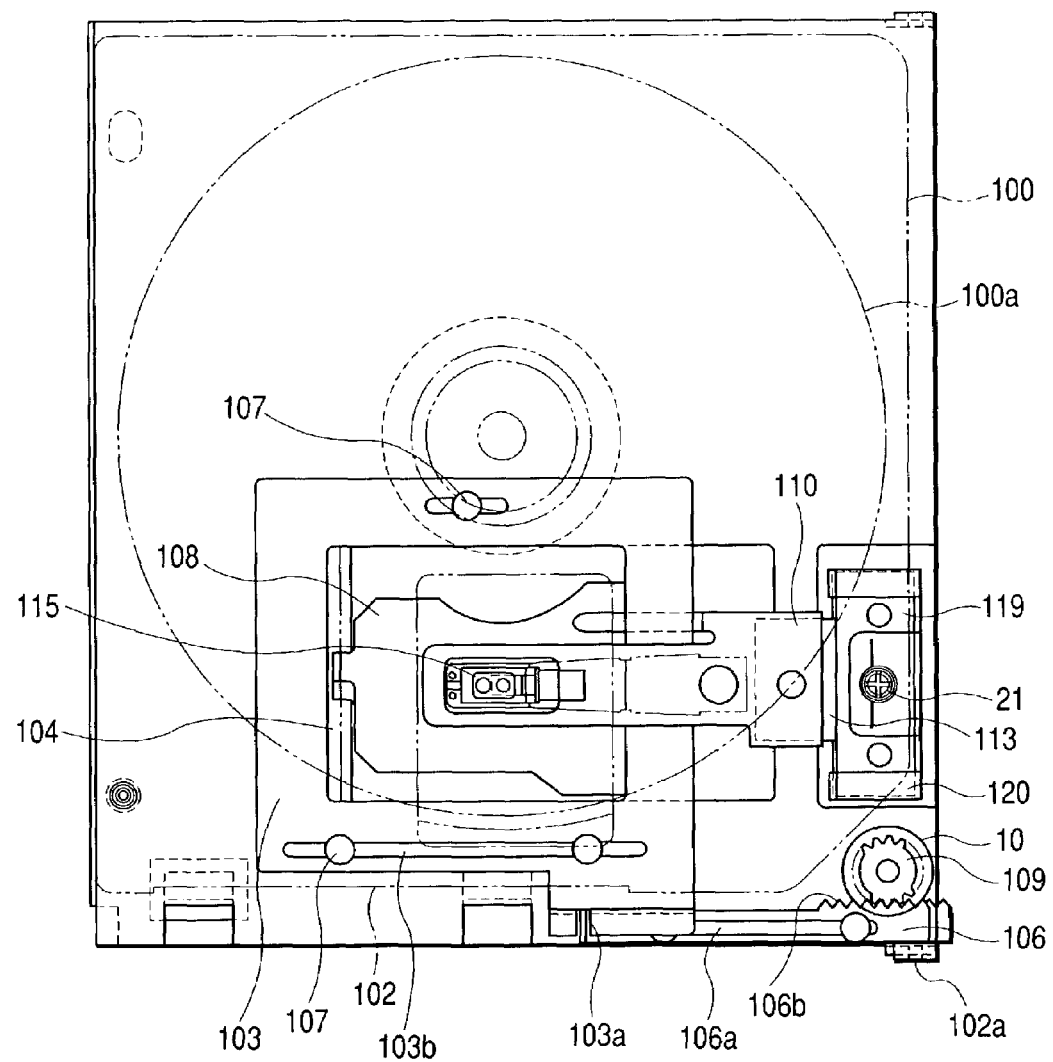
FIG. 4 is a plan view showing a magnetooptical recording apparatus in accordance with an embodiment of the present invention.
Figure 5:
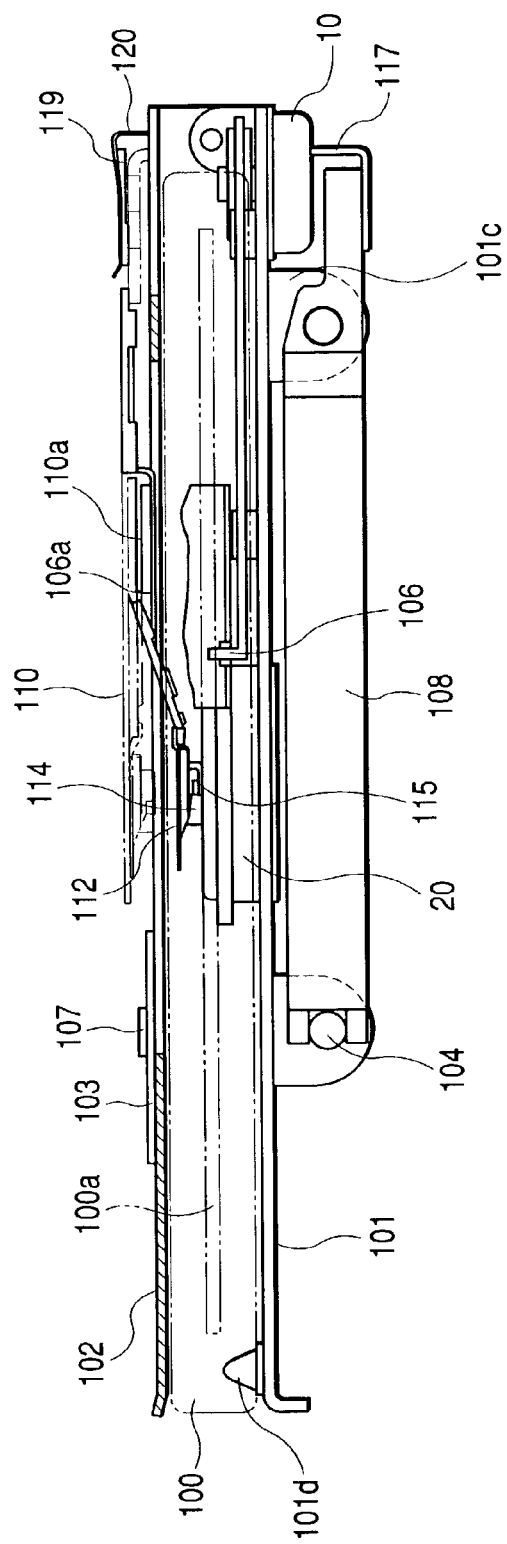
FIG. 5 is a side view showing the magnetooptical recording apparatus shown in FIG. 4.
Figure 6:
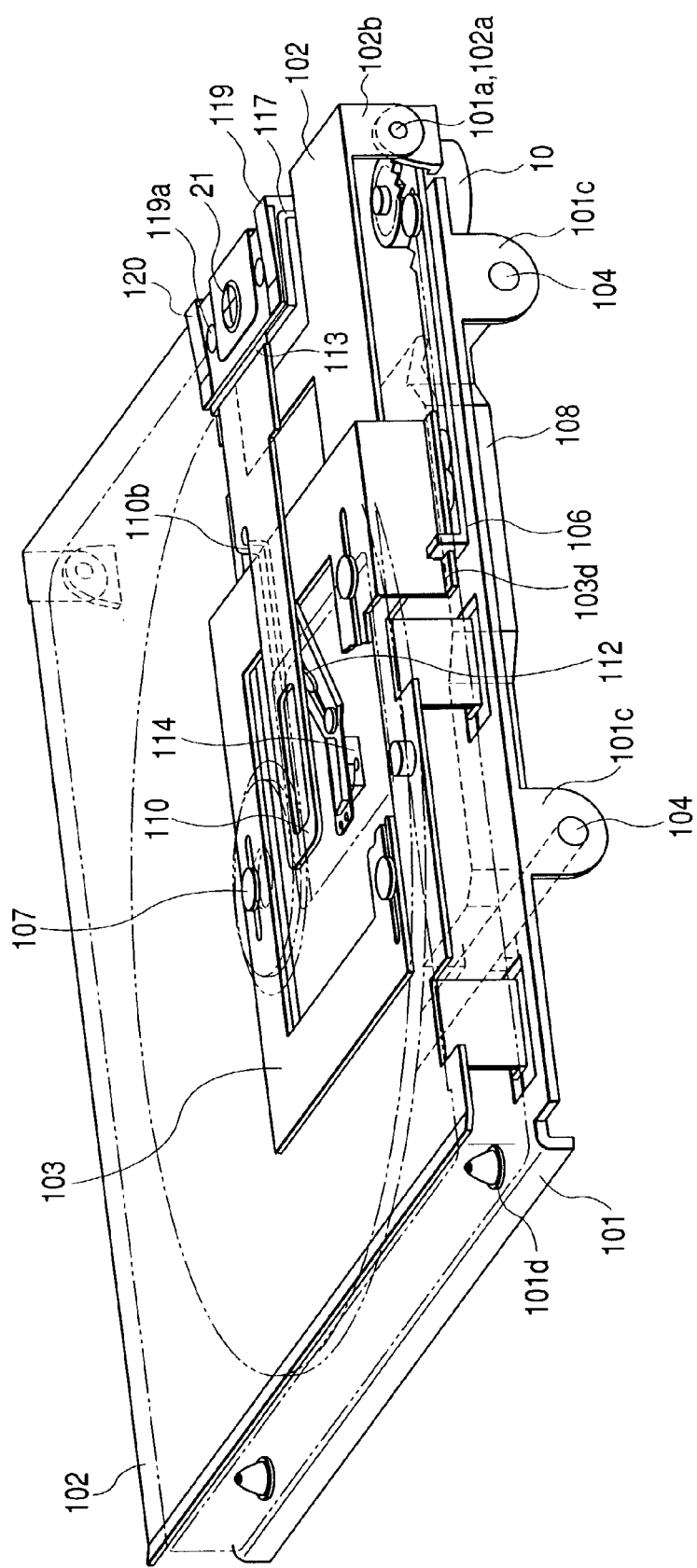
FIG. 6 is a perspective view showing the magnetooptical recording apparatus shown in FIG. 4.

FIG. 4 is a plan view showing the structure of a magnetooptical recording apparatus in accordance with the present invention, FIG. 5 is a side view thereof, and FIG. 6 is a perspective view thereof.

In the figure, reference numeral 100 denotes a magnetooptical disk cartridge (hereinafter referred to as "cartridge"), and 100a is a magnetooptical disk that is received in the cartridge 100. Reference numeral 101 denotes a chassis main body which serves as the structural basis of the apparatus, and 102 is a cartridge holder that holds the cartridge 100. In this example, assuming that an upper right side end portion of the drawing is a rear end portion of the chassis main body 101 in FIG. 6, support portions 101a for opening and closing the cartridge holder 102 are disposed on both end portions of the rear end portion of the chassis main body 1. Each of the support portions 101a is bent at a right angle with respect to the horizontal plane of the chassis main body 101, and a convex portion is formed inside thereof as a rotating center.

On the other hand, each of both end portions of the rear end portion of the cartridge holder 102 is likewise bent at a right angle to form an ear portion 102b, and a bearing hole 102a is formed in the ear portion 102b. The convex portion which is formed in the support portion 101a of the chassis main body 101 is engaged with the bearing hole 102a which is formed in the ear portion 102b on each of the both sides of the cartridge holder 102. This structure allows the cartridge holder 102 to open and close about a rotating fulcrum, which is made up of the convex portion and the bearing hole 102a, as a center so that the cartridge 100 can be loaded or extracted with respect to the apparatus.

Also, a spindle motor (hereinafter referred to as "turntable") 20 for positioning and mounting the cartridge 100 thereon and for rotating the magnetooptical disk 100a is disposed in the substantially center of the chassis main body 101. In addition, two support fixing portions 101c which are bent at a right angle with respect to the horizontal plane of the chassis main body 101 are formed in the chassis main body 101, and two guide axes 104 that movably support the optical pickup 108 are held at the support fixing portions 101c.

The optical pickup 108 is so structured as to move in a radial direction of the magnetooptical disk 100a along the guide axis 104 by rotating a feed screw (lead screw) which is rotatably supported by the chassis main body 101, by driving a seek motor (not shown) so that a desired position of the magnetooptical disk 100a can be accessed. The bottom surface of the optical pickup 108 is fixed to a head support arm 117 as shown in FIG. 5. The head support arm 117 is U-shaped, and the optical pickup 108 and the magnetic head are coupled to each other by the head support arm 117. This structure allows the optical pickup 108 and the magnetic head to move in the radial direction of the magnetooptical disk 100a at the same time.

On the other hand, at least three guide pins 107 are disposed on the cartridge holder 102 so as to project upward from the cartridge holder 102. On the upper surface of the cartridge holder 102, there is disposed a slide plate 103 having a slender hole 103b which is engaged with these guide pins 107. An L-shaped arm portion 103d is formed on the slide plate 103 along the side surface of the cartridge holder 102 as shown in FIG. 6, and a notch 103a is formed on the arm portion 103d. A leading portion of an L-shaped lever 106 for moving the slide plate 103 in the tangential direction is engaged with the notch 103a.

The lever 106 is formed with a slender hole 106a that is engaged with the guide pin 107 of the chassis main body 101, and the lever 106 is so structured as to be movable by a given stroke length. Also, a rack gear portion 106b is formed on the rear end portion of the lever 106. A motor 10 and a gear 109 that is fixed onto a rotating shaft of the motor 10 are disposed on the chassis main body 101, and the gear 109 is engaged with the rack gear portion 106b of the lever 106.

When the motor 10 is driven, the rotation of the motor 10 is transformed into a linear motion of the lever 106 via the gear 109 and the rack gear portion 106b, and the slide plate 103 moves along the slender hole 103b with the linear motion of the lever 106. In this example, the slide plate 103 is a member for moving up and down the magnetic head, and moves down the magnetic head when the magnetooptical disk is loaded so that the magnetic head slider 114 is abutted against the disk surface, and moves up the magnetic head to retreat the magnetic head from the disk surface when the magnetooptical disk is unloaded. This operation will be described in more detail later.

Figure 7:
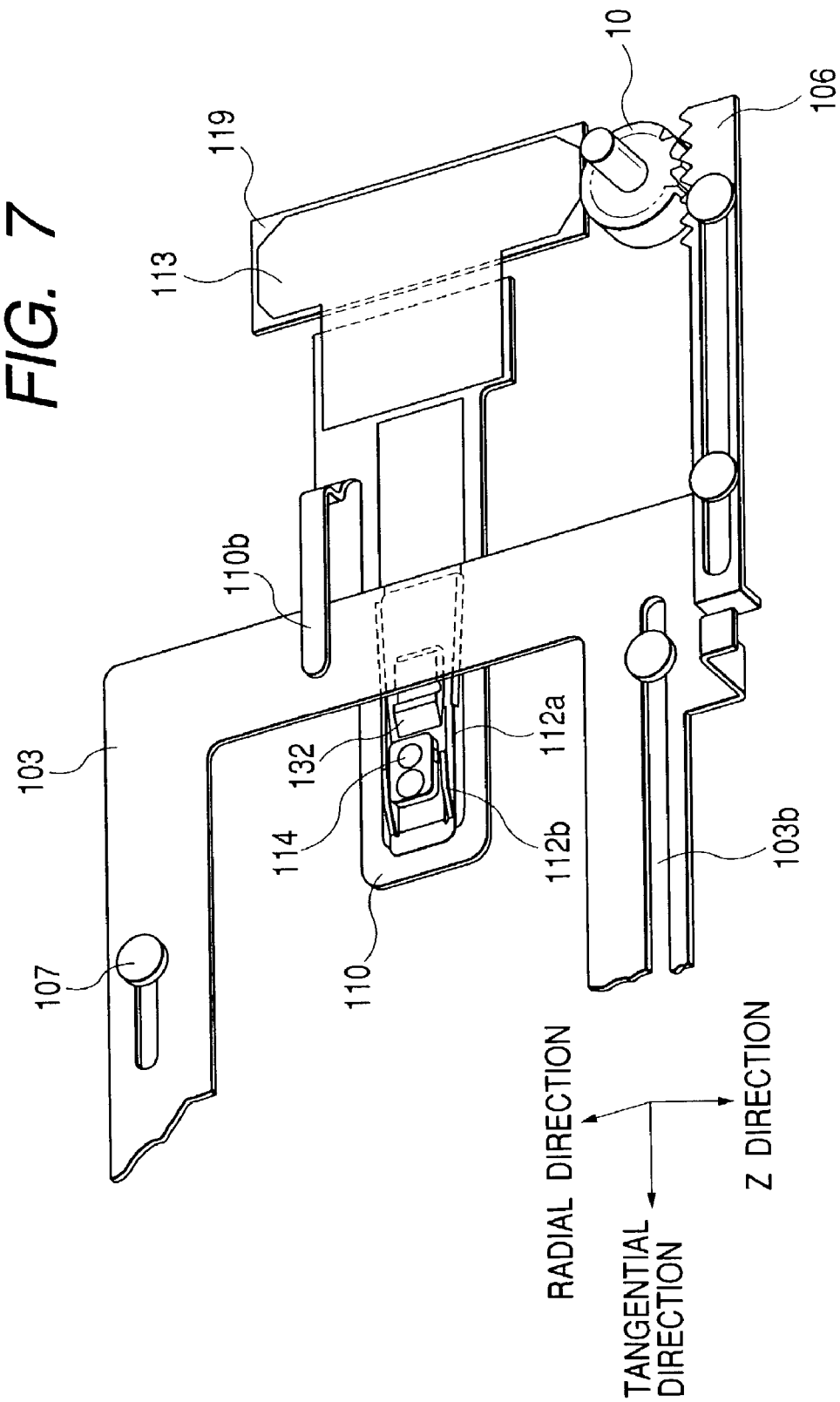
FIG. 7 is a perspective view showing the periphery of a magnetic head portion at the time of unloading in detail.
Figure 8:
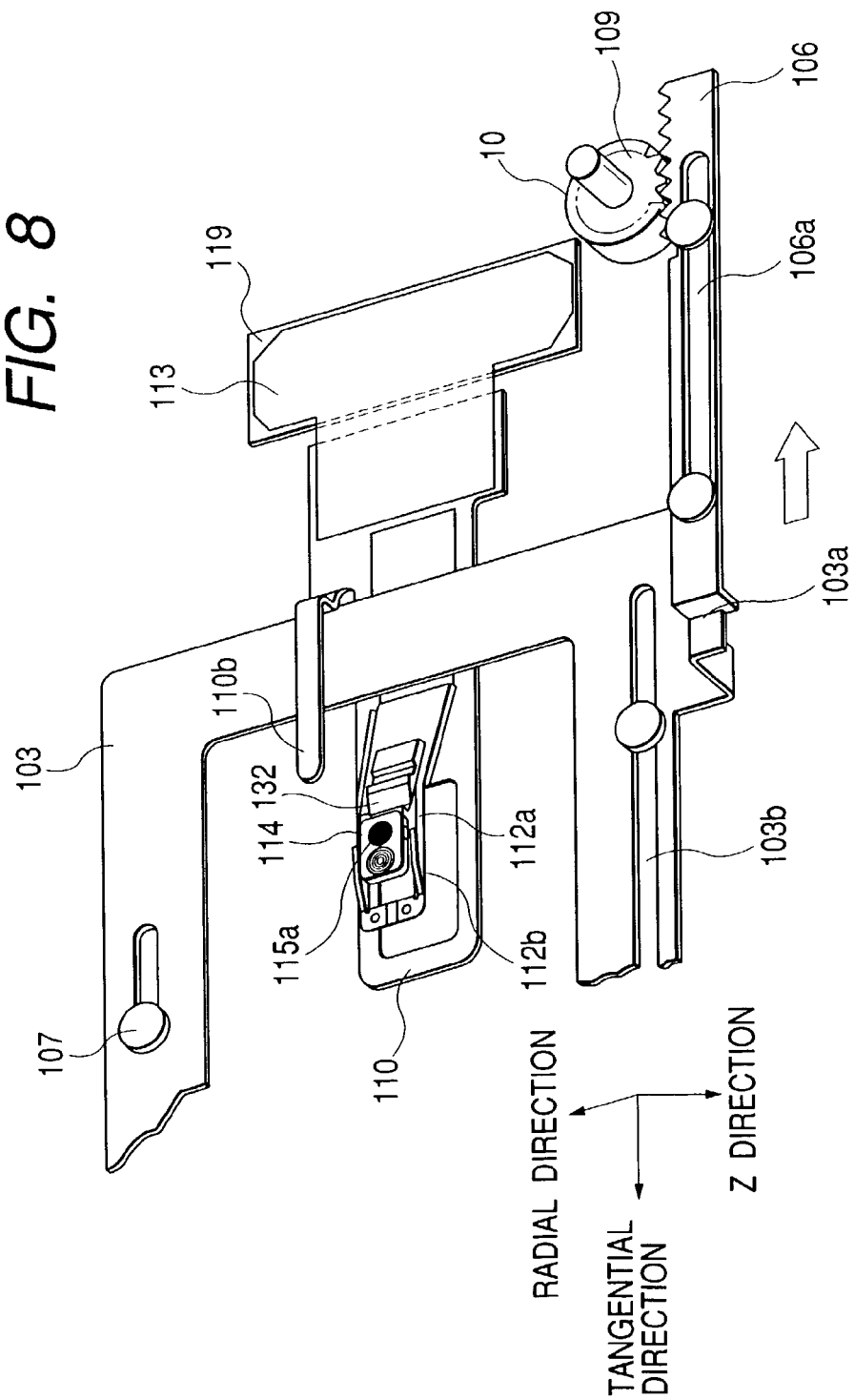
FIG. 8 is a perspective view showing the periphery of a magnetic head portion at the time of loading in detail.
Figure 9:
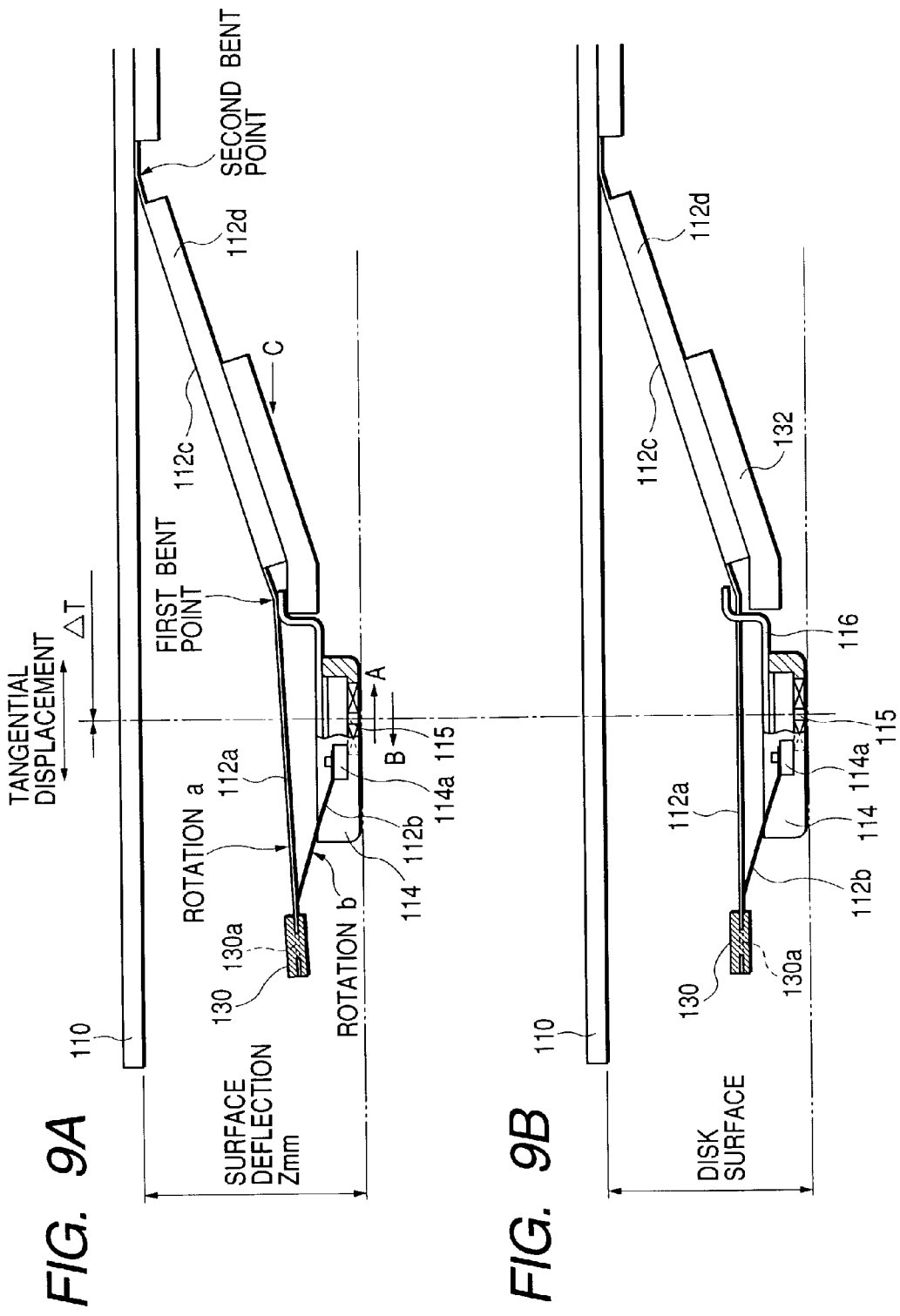
FIGS. 9A and 9B are side views showing the periphery of the magnetic head portion in detail.
Figure 10:
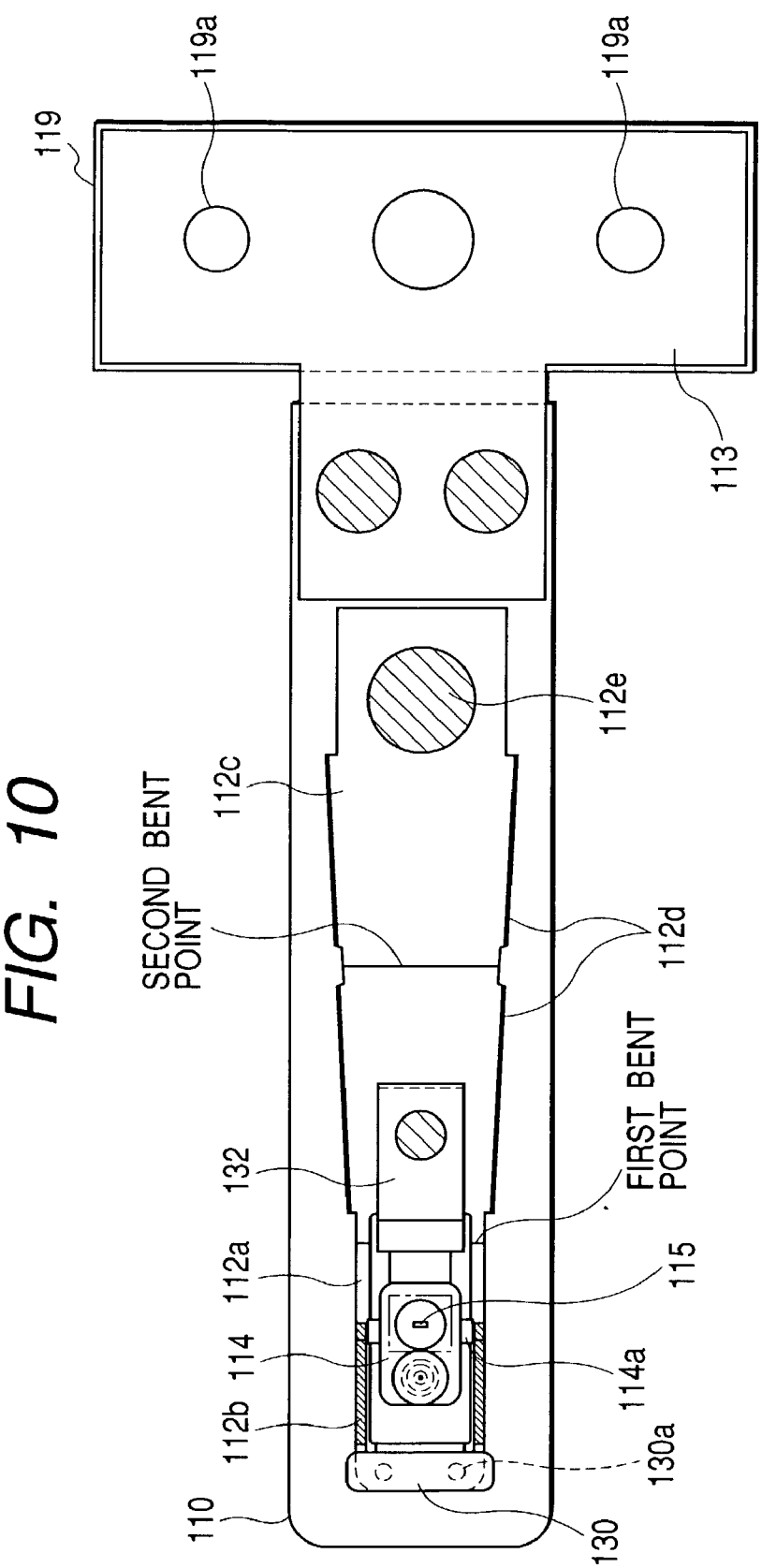
FIG. 10 is a plan view showing the periphery of the magnetic head portion in detail.

Next, the support structure of the magnetic head will be described. FIGS. 7 and 8 are perspective views showing the periphery of the magnetic head in detail, in which FIG. 7 shows a state at the time of unloading and FIG. 8 shows a state at the time of loading. FIGS. 7 and 8 are views showing the periphery of the magnetic head as viewed from the rear surface. Also, FIGS. 9A and 9B are side views of the periphery of the magnetic head, and FIG. 10 is a plan view thereof. First, FIGS. 9A and 9B show a state in which the magnetic head is abutted against the disk surface, and the magnetic head slider 114 is in contact with the disk surface with a given contact pressure. A core and coil (which is wound on the core) 115 of a desired size is built in the slider 114 and integrally formed therewith. When information is to be recorded, the magnetooptical disk 100a rotates while the slider 114 slides on the disk surface.

The magnetic head potion including the slider 114 and the core and coil 115 are supported by a first elastic member 112a and a second elastic member 112b. Each of the first elastic member 112a and the second elastic member 112b has a leading portion that is substantially U-shaped as shown in FIG. 10, and a joint hole 130a for joining these elastic members is formed in each of the leading portions thereof. Positioning and the like are performed by means of the joint holes 130a, and the joint holes 130a are filled with a resin or otherwise filled using soldering or the like to thereby join the first and second elastic members 112a and 112b to each other. Reference numeral 130 denotes a joint portion.

The second elastic member 112b is bent in the vicinity of the joint portion 130 at a given angle with respect to the first elastic member 112a, and the base end portion thereof is fixed to the ear portion 114a disposed on both sides of the slider 114. The first elastic member 112a extends linearly from the joint portion 130 and is bent at a given angle at a first bent point. Also, the first elastic member 112a is so formed as to be narrow from the joint portion 130 to the vicinity of the first bent point and wide from the first bent point as shown in FIG. 10. Reference 112c is a wide portion. Both sides of the wide portion 112c are bent in a U-shape to form a bent portion 112d which is useable as a rigid body. The middle portion of the wide portion 112c is bent at a given angle to form a second bent point, and the base end portion of the first elastic member 112a is fixed to a base substrate 110 at a fixing portion 112e.

Also, as shown in FIGS. 9A and 9B, a stopper 132 is fixed onto the wide portion 112c of the first elastic member 112a, and a hook portion 116 is disposed on the slider 114. The stopper 132 is pushed and moved in a direction indicated by an arrow C with the movement of the slide plate 103 at the time of unloading as described above, and upon pushing and moving the hook portion 116, the first elastic member 112a rotates at a fulcrum of the second bent point. As a result, the magnetic head portion moves up, the joint portion 130 is retained on the base substrate 110, and the magnetic head portion retreats from the disk surface.

In this case, because the hook portion 116 is further pushed and moved in a state where the joint portion 130 is retained on the base substrate 110, the second elastic member 112b rotates at a fulcrum of the joint portion 130, and there is formed substantially no angle between the second elastic member 112b and the first elastic member 112a. On the other hand, when the disk is loaded, because the slide plate 103 moves in the opposite direction and the stopper 132 is released, the magnetic head portion moves down, and the slider 114 is abutted against the disk surface as shown in FIGS. 9A and 9B. In FIGS. 9A and 9B, FIG. 9A shows a case in which the surface of the disk is deflected, and FIG. 9B shows a case in which the surface of the disk is not deflected.

The base substrate 110 is fixed onto an adjustment plate 119 through an elastic member 113 as shown in FIGS. 6 and 10. The base substrate 110 is formed with a lever 10b as shown in FIG. 7, and a rear end portion of the slide plate 103 is positioned inside the lever 10b. When the cartridge holder 102 is opened and closed, the magnetic head portion moves up and down together with the cartridge holder 102 because the slide plate 103 is engaged with the lever 110b.

The adjustment plate 119 is employed for positional adjustment of the magnetic head portion and the optical pickup 108 and fixed to a U-shaped head support arm 117 that couples the optical pickup 108 and the magnetic head portion through the elastic member 113 as shown in FIGS. 4 and 6. In this example, in the case where the positional adjustment is conducted by using the adjustment plate 119, the adjustment plate 119 is tentatively fixed by using the U-shaped elastic member 120 and then tentatively fastened by a screw 21.

In that state, the positional adjustment of the adjustment plate 119 is conducted by using a positioning jig (not shown) in such a manner that the center of the generated magnetic field of the magnetic head portion coincides with the optical axis of the light spot of the optical pickup 108. In this situation, a jig hole 119a is formed in the adjustment plate 119, and the position of the adjustment plate 119 is adjusted by means of the jig hole 119a to position the light spot axis and the generated magnetic field relative to each other. Upon completion of the positional adjustment, the adjustment plate 119 is finally fixed to the head support arm 117 by using the screw 21.

Figure 11:
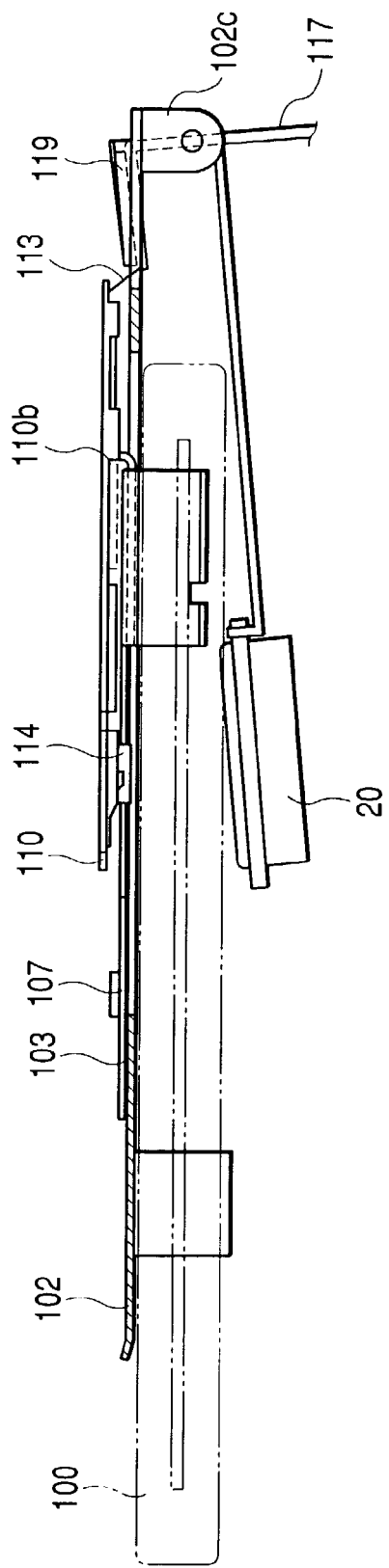
FIG. 11 is a side view showing a state in which a cartridge holder is opened.

Then, the operation of this embodiment will be described. First, when one end of the cartridge holder 102 is lifted up, the cartridge holder 102 rotates about the bearing hole 102a as a fulcrum as shown in FIG. 11, and thus the cartridge 100 is made loadable into or dischargeable from the apparatus. In this state, when the cartridge 100 is inserted and further inserted up to a given position, a shutter (not shown) of the cartridge 100 is opened by an open/close mechanism using a lever which is not shown. Then, when the cartridge holder 102 is closed as shown in FIG. 5, the magnetooptical disk 100a within the cartridge 100 is positioned by a positioning pin 101d and then mounted on the turntable 20. In this situation, the magnetic head portion is in a state shown in FIG. 7. That is, the lever 106 and the slide plate 103 are positioned as shown in FIG. 7, and the stopper 132 is pushed and moved by the slide plate 103, and the magnetic head portion retreats with respect to the disk surface. Also, the slider 114 is retained on the base substrate 110 so as to be in a standby state.

In this state, when a record command issues from a control portion (not shown), a seek motor (not shown) is driven, and the optical pickup 108 and the magnetic head portion move in the radial direction of the magnetooptical disk 100a. When the optical pickup 108 and the magnetic head portion move to a desired position and thus the seek operation is completed, the motor 10 is driven and the lever 106 then moves in a direction indicated by an arrow shown in FIG. 8. This movement makes the slide plate 103 move in the direction indicated by the arrow. This operation may be conducted prior to the seek operation of the magnetic head.

In this situation, the stopper 132 that is fixed to the first elastic member 112a is released from the slide plate 103, and the slider 114 is abutted against the disk surface with a given contact pressure at the second bent point of the first elastic member 112a as a fulcrum. In this state, the magnetooptical disk 100a rotates, a recording magnetic field which is modulated in accordance with the recording information is applied from the core and coil 115 while the slider 114 slides on the disk surface, and at the same time, a recording light beam is irradiated from the optical pickup 108, to thereby record information in the magnetooptical disk 100a.

Here, when the magnetooptical disk 100a is loaded, rotation occurs from the second bent point due to the spring urging force of the first elastic member 112a as shown in FIG. 9A. This rotation is shown as "rotation a". When this rotation causes the slider 114 to abut against the disk surface, rotation occurs about the joint portion 130 as a fulcrum in a direction opposite to that caused by the first elastic member 112a, due to the spring urging force of the second elastic member 112b. This is shown as "rotation b". That is, as shown in FIG. 9A, the rotation a functions as a displacement of the magnetic head portion in the direction indicated by the arrow A, the rotation b functions as a displacement of the magnetic head portion in the direction indicated by the arrow B, and the displacement in the tangential directions indicated by the arrows A and B are canceled by the spring bending amounts of the first and second elastic members 112a and 112b and the rotation angles.

Also, the rotation a by the first elastic member 112a and the rotation b by the second elastic member 112b change in accordance with the surface deflection amount of the magnetooptical disk 100a in such a manner that the displacement of the magnetic head portion in the tangential direction is always held to 0 (or a value close to 0). Because the displacement of the magnetic head portion can be suppressed regardless of the surface deflection of the magnetooptical disk 100a as described above, the positional displacement of the generated magnetic field center of the core and coil 115 that is fixed to the slider 114 with respect to the light spot optical axis of the optical pickup 108 in the tangential direction can be suppressed to be extremely small. FIG. 9A shows a state of the magnetic head portion when the surface of the magnetooptical disk 100a is deflected, but it is found that the displacement $\Delta T$ of the magnetic head portion in the tangential direction is extremely small as in the case where the surface is not deflected as shown in FIG. 9B.

Also, it is needless to say that the spring thickness, the width, the elastic coefficient and so on of the first and second elastic members 112a and 112b are set to optimum values so as to suppress the displacement of the magnetic head portion in the tangential direction which occurs following the surface deflection of the magnetooptical disk as described above. Specifically, the elastic coefficient of the first elastic member 112a is larger than that of the second elastic member 112b. Also, the second elastic member 112b is equal in thickness to the first elastic member 112a, and the second elastic member 112b is smaller in width (the narrow portion of the first elastic member 112a and the width of the second elastic member 112b) than the first elastic member 112a (narrow portion).

When information is played back, a light beam for playback is irradiated onto the magnetooptical disk 100a from the optical pickup 108, and its reflected light is detected by a photo-sensor (not shown) within the optical pickup, and a given signal processing is conducted by using a detection signal from the photo-sensor, to thereby play back the recorded information.

Here, a method of adjusting the displacement of the magnetic head portion in the tangential direction by controlling the widths of the first and second elastic members allows the adjustment of the displacement to be more readily performed as compared with a method of controlling the thicknesses of the first and second elastic members. This is because, although the adjustment of the thickness cannot be achieved by only the correction of a molding, the adjustment of the width can be readily achieved by the correction of the width of the molding. For that reason, because the number of equipment to be manufactured can be reduced and the number of processing steps can be significantly reduced, there is obtained a great advantage that the manufacturing costs can be greatly reduced.

(Second Embodiment)

The difference of a second embodiment from the above-mentioned first embodiment resides in the support structure for the magnetic head, and the structures indicated by identical reference numerals show structures having the same functions, and description thereof will be omitted.

Figure 12:
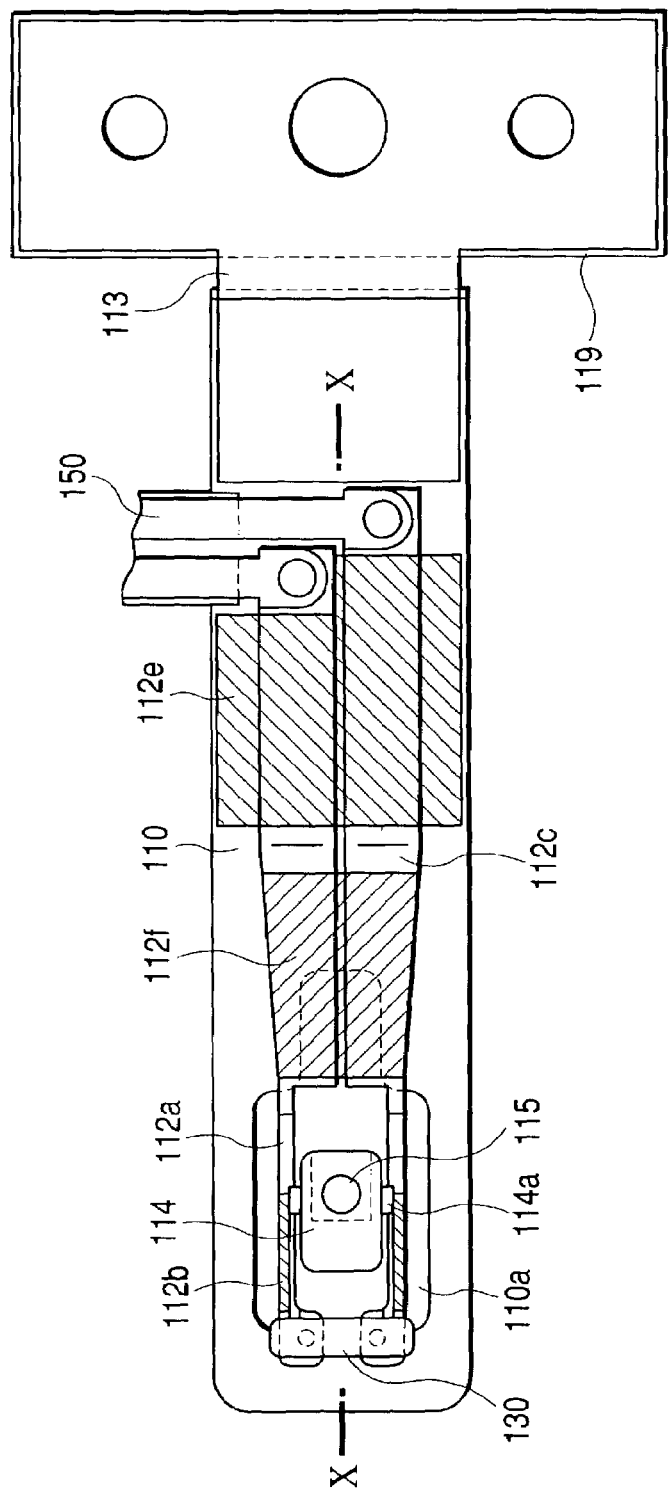
FIG. 12 is a plan view showing in detail the periphery of a magnetic head portion in accordance with a second embodiment of the present invention.
Figure 13:
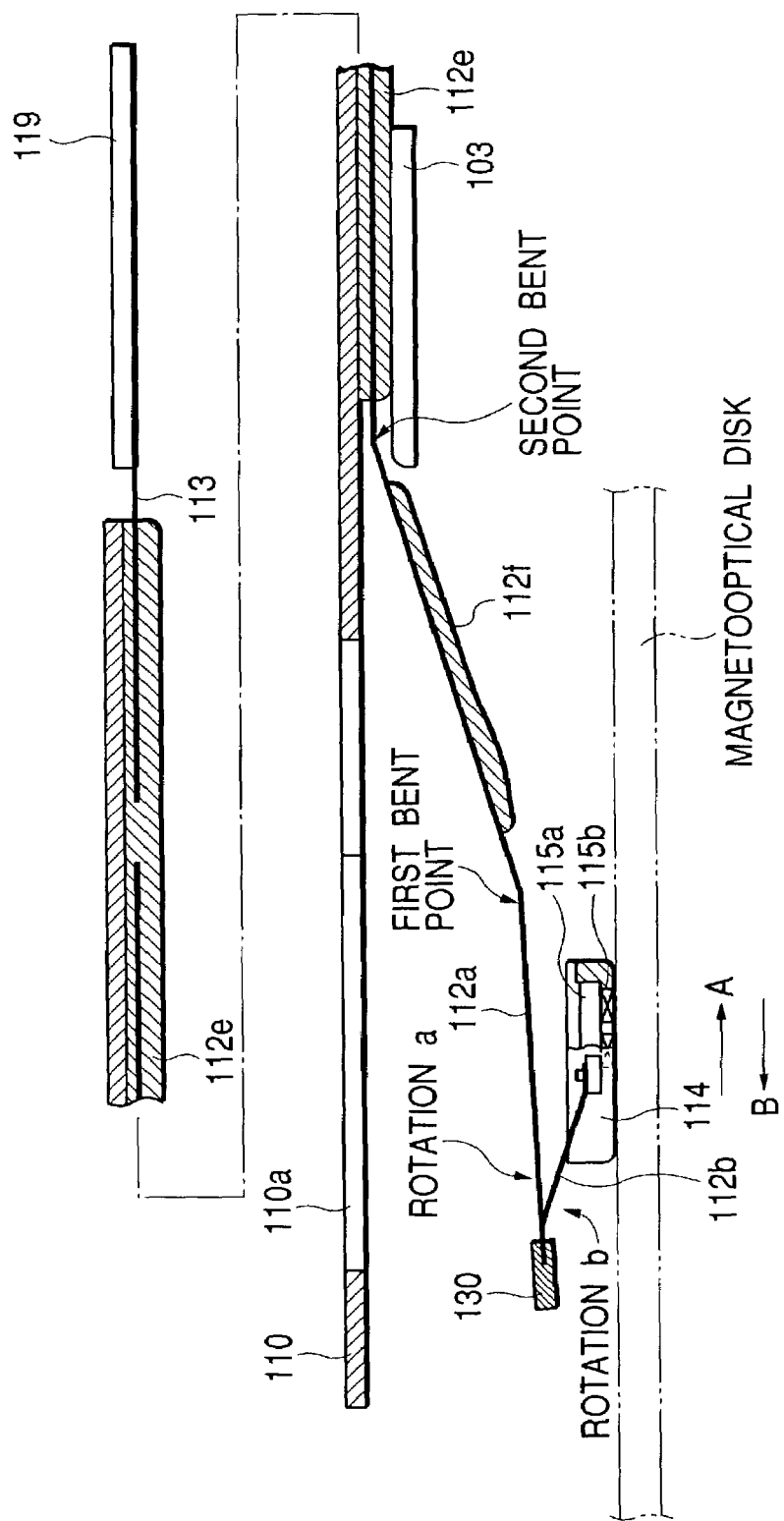
FIG. 13 is a perspective view showing the periphery of the magnetic head portion at the time of loading in detail.
Figure 14:
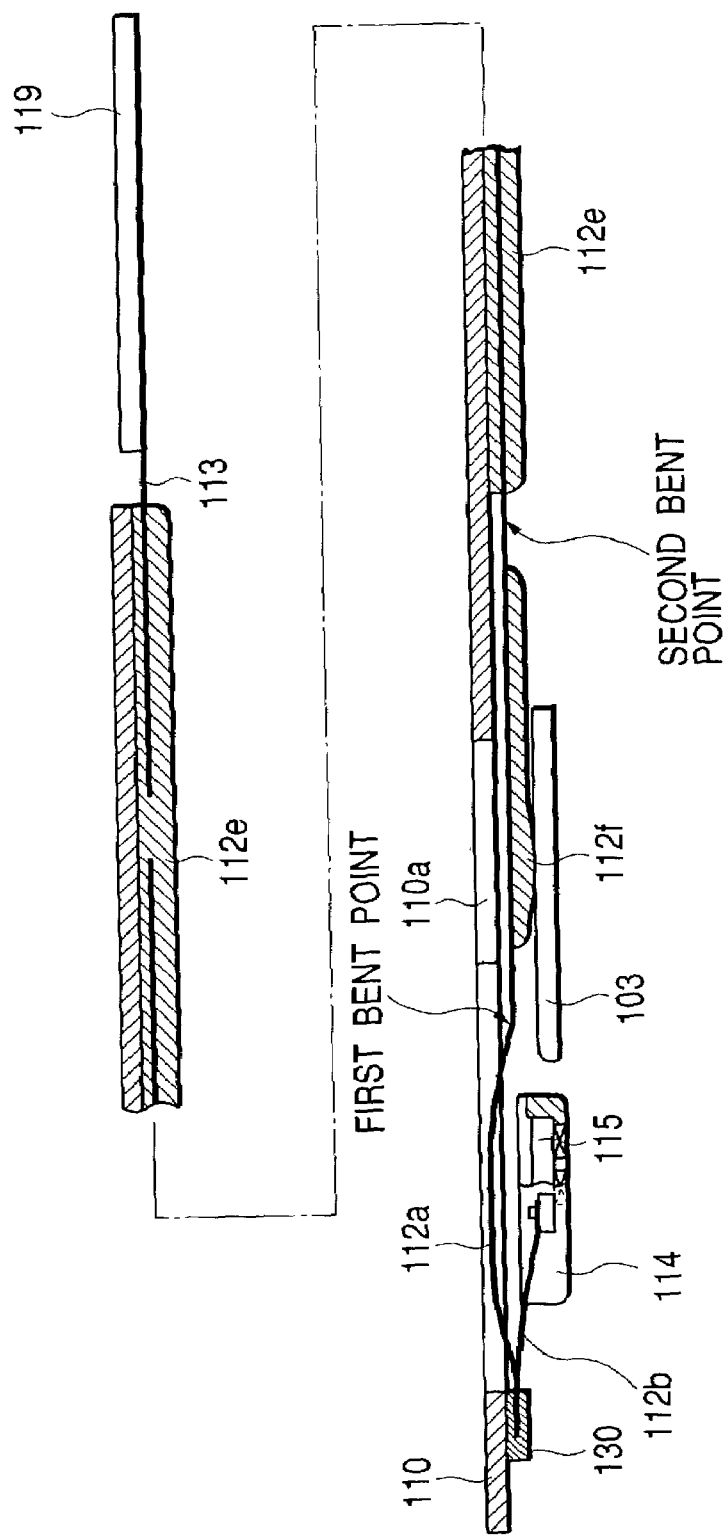
FIG. 14 is a perspective view showing the periphery of the magnetic head portion at the time of unloading in detail.

FIG. 12 shows a plan view of a magnetic head portion, FIG. 13 shows a state at the time of loading, and FIG. 14 shows a state at the time of unloading. FIGS. 13 and 14 show the periphery of the magnetic head as viewed from the side surface. First, FIG. 13 shows a state in which the magnetic head slider 114 is abutted against the disk surface, and the magnetic head slider 114 is urged through the elastic members 112a and 112b so as to be in contact with the disk surface with a given contact pressure.

A magnetic pole core 115a and a coil 115b (wound around the core) of desired sizes are built in the magnetic head slider 114 and integrally formed with the magnetic head slider 114. The core 115a and the coil 115b are called "magnetic head element".

When information is recorded, the magnetooptical disk 100a rotates while the magnetic head slider 114 slides on the disk surface. Although described in detail later, the magnetic head slider 114 which includes the magnetic head element 115 comprised of the magnetic core and the coil is supported by two elastic members 112a and 112b each having electricity and electrically conductivity and being made of a metal or the like. The elastic members 112a and 112b each also serve as a feeding member that supplies a drive current to the coil 115b from a magnetic head drive circuit (not shown).

The elastic member 112a and the elastic member 112b each have leading portions that are substantially U-shaped as shown in FIG. 12, and these leading portions are joined together by a joint member 130 on a line X—X of FIG. 12. The joint member 130 is made of a resin or the like, and the elastic members 112a and 112b are electrically insulated from each other at the leading portions on the line X—X. Also, the elastic members 112a and 112b are electrically connected on both sides divided by the line X—X in the leading portions by a method such as solder-welding or the like as shown in FIG. 13.

In addition, the elastic member 112a is divided into two pieces at its middle portion in the longitudinal direction as shown in FIG. 12, and the respective base end portions thereof are fixed to the base substrate 110. In this situation, the base end portion of the elastic member 112a is electrically connected to the feeding portion 150 so as to supply a drive current to the coil 115b as described above.

The elastic member 112b is bent at a given angle with respect to the elastic member 112a in the vicinity of the joint member 130 as shown in FIG. 13, and the base end portion thereof is fixed to the ear portions 114a on both sides of the magnetic head slider 114. A wiring (not shown) is connected to the coil 115b from the ear portion 114a.

On the other hand, the elastic member 112a extends linearly from the joint portion 130 as shown in FIG. 13 and is bent at a given angle at the first bent point. Also, the elastic member 112a is so formed as to be narrow (narrow portion) from the joint portion 130 to the vicinity of the first bent point and to be wide from the vicinity of the first bent portion. Reference 112c denotes the wide portion described above.

The disk surface side of the wide portion 112c is fitted with a stopper guide portion 112f over a desired length substantially along the width of the elastic member 112a as indicated by oblique lines in FIG. 12. The stopper guide portion 112f is made of an insulating material such as a resin and is disposed in order to insulate the elastic member 112a and reinforce it as a rigid body.

When the magnetic head is unloaded (at the time of non-recording), the stopper guide portion 112f is pushed and moved by the slide plate 103 and thus serves as a stopper guide for lifting up the magnetic head slider 114. For that reason, the insulating stopper guide 112f which is made of a resin or the like is formed to insulate the slide plate 103 and the elastic member 112a from each other.

In addition, the elastic member 112a is bent at a given angle in the middle portion of the wide portion 112c as shown in FIG. 13, to thereby form a second bent point. The elastic member 112a and the base substrate 110 are fixedly provided with an insulating fixing portion 112e (a portion within a range indicated by oblique lines in FIG. 12) which is made of a resin and is integrally formed therewith over an area of from the vicinity of the second bent point to the vicinity of the feeding portion 150. The fixing portion 112e is provided for the purposes of reinforcing and insulating the elastic member 112a and the base substrate 110.

The elastic members 112a and 112b operate so as to suppress displacement of the magnetic head portion in the tangential direction, as will be described in more detail later. The spring thicknesses, the plate widths, the elastic coefficients and so on of the elastic members 112a and 112b are set to optimum values so as to suppress the displacement of the magnetic head portion in the tangential direction which occurs following the surface deflection of the magnetooptical disk.

The elastic coefficient of the first elastic member 112a is larger than that of the second elastic member 112b. Also, the second elastic member 112b is equal in thickness to the first elastic member 112a, and the second elastic member 112b is smaller in width (the narrow portion of the first elastic member 112a and the width of the second elastic member 112b) than the first elastic member 112a (narrow portion).

The base substrate 110 is fixed onto an adjustment plate 119 through an elastic member 113 as shown in FIGS. 4 and 13. When the cartridge holder 102 is opened and closed, the magnetic head portion moves up and down together with the cartridge holder 102. The adjustment plate 119 is employed for positional adjustment of the magnetic head portion and the optical pickup 108 and fixed to a U-shaped head support arm 117 that couples the optical pickup 108 and the magnetic head portion through the elastic member 113 as shown in FIG. 4.

In the case where the positional adjustment is conducted by using the adjustment plate 119, the adjustment plate 119 is tentatively fixed by using the U-shaped elastic member 120 and then tentatively fastened by a screw 21. In that state, the positional adjustment of the adjustment plate 119 is conducted by using a positioning jig (not shown) in such a manner that the center of the generated magnetic field of the magnetic head portion coincides with the optical axis of the light spot of the optical pickup 108.

In this situation, a jig hole 119a is formed in the adjustment plate 119, and the position of the adjustment plate 119 is adjusted through the jig hole 119a to thereby position the light spot axis and the generated magnetic field with respect to each other. Upon completion of the positional adjustment, the adjustment plate 119 is finally fixed to the head support arm 117 by using the screw 21.

Then, the operation of this embodiment will be described. First, in the case where the operation shifts from the load state to the unload state, the motor 10 is driven, and the slide plate 103 moves in a direction indicated by an arrow B in FIG. 13. When the stopper guide portion 112f is pushed and moved in a direction indicated by the arrow B with the movement of the slide plate 103, the elastic member 112a rotates about the second bent point as a fulcrum. As a result, the magnetic head portion moves up, the joint portion 130 is retained on the leading portion of the base substrate 110 as shown in FIG. 14, and the magnetic head slider 114 retreats from the disk surface of the magnetooptical disk 100a.

In this case, because the stopper guide portion 112f is further pushed and moved in a state where the joint portion 130 is retained on the base substrate 110, the elastic member 112b rotates about the joint portion 130 as a fulcrum, and the elastic member 112a is bent in an arc-shape as shown in FIG. 14, and the elastic member 112a is inserted into an opening hole 110a of the base substrate 110. In addition, the operation causes the elastic member 112b to be lifted up about the joint portion 130 as a fulcrum such that the elastic member becomes substantially in parallel with the base substrate 110. That is, the magnetic head is stabilized in a position shown in FIG. 14 by utilization of the rotation of the elastic member 112b and the elastic deformation of the elastic member 112a represented as the arc-shaped bending. This state indicates the position of the magnetic head at the time of unloading. When the position of the magnetic head portion is thus stabilized by using the elastic deformation of the elastic members 112a and 112b, because a locking mechanism that locks the position of the magnetic head portion at the time of unloading, for example when the magnetic head slider 114 is lifted up, becomes unnecessary, the structure of the apparatus can be simplified by that much, and the apparatus can be downsized and thinned. It is needless to say that the length of from the first bent point of the elastic member 112a to the joint portion 130 and the length of the elastic member 112b are set to optimum lengths so that the position of the magnetic head portion is stabilized at the time of unloading.

Figure 15:
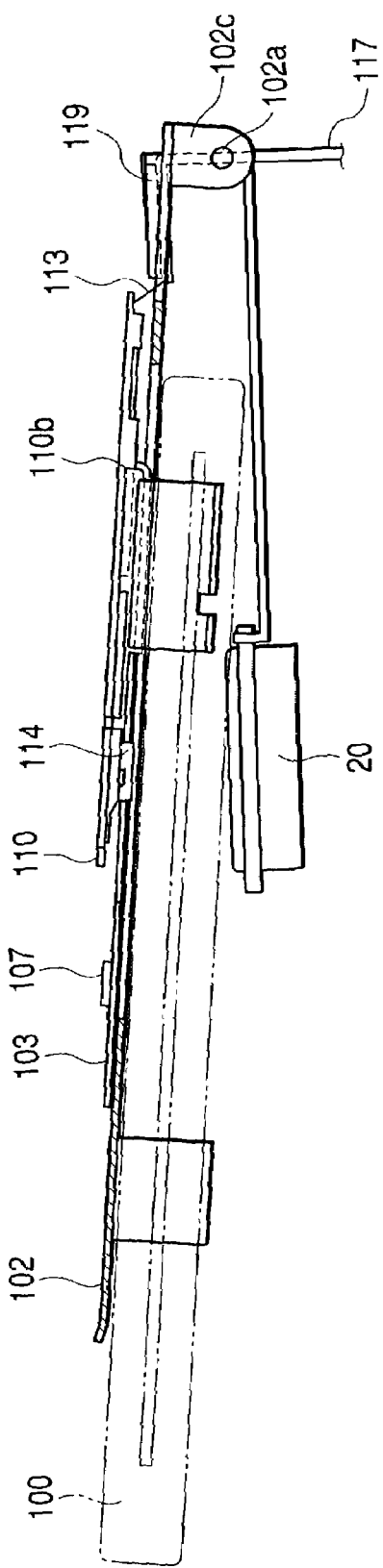
FIG. 15 is a side view showing a state in which a cartridge holder is opened.

When the cartridge holder 102 is opened after the magnetic head portion comes to an unload position, the cartridge holder 102 rotates about the bearing hole 102a that is a rotating point as a fulcrum as shown in FIG. 15, and the disk cartridge 100 can be loaded and discharged. In this case, as shown in FIG. 15, the base substrate 110 rotates about the bearing hole 102a together with the cartridge holder 102 and the slide plate 103 through the elastic member 113.

In this position, when the disk cartridge 100 is inserted and further inserted up to a given position, a shutter of the cartridge holder 102 is opened through a lever (not shown). Then, when the cartridge holder 102 is closed, the disk cartridge 100 is positioned by the positioning pin 101d, and the magnetooptical disk 100a is positioned and mounted on the turntable 20.

In this state, when the motor 10 starts, the slide plate 103 moves in a direction indicated by an arrow A by engagement of the motor gear 109 with the rack gear portion of the lever 106, to thereby release the stopper guide portion 112f. With this releasing, the elastic member 112a that is fixedly supported to the base substrate 110 is released, and the magnetic head slider 114 moves down due to the urging force of the elastic member 112a and is then abutted against the disk surface of the magnetooptical disk 100a with a given contact pressure.

In a state where the magnetooptical disk 100a is loaded, rotation occurs from the second bent point due to the spring urging force of the elastic member 112a as shown in FIG. 13. This is shown as "rotation a". With this rotation, when the slider 114 is abutted against the disk surface, the elastic member 112b rotates in a direction opposite to the rotation a with the joint portion 130 as a fulcrum, due to the spring urging force of the elastic member 112b. This is shown as "rotation b".

That is, as shown in FIG. 13, the rotation a operates as displacement of the magnetic head portion in the direction indicated by the arrow A, and the rotation b operates as displacement of the magnetic head portion in the direction indicated by the arrow B, and the displacements of the magnetic head portion in the tangential directions indicated by the arrows A and B are offset by the spring bending amounts and the rotation angles of the elastic members 112a and 112b. Therefore, the magnetic head slider 114 is abutted against the magnetooptical disk surface in such a manner that the center of the magnetic head element 115 is not largely shifted in the tangential direction with respect to the optical beam of the optical pickup 108.

In this state, when a record command is issued from a control portion (not shown), a seek motor (not shown) is driven, and the optical pickup 108 and the magnetic head portion move in the radial direction of the magnetooptical disk 100a. When the optical pickup 108 and the magnetic head portion move to a desired position, the seek operation is completed and recording of information starts.

In this case, at the time where the magnetic head is loaded, the magnetooptical disk 100a rotates, a recording magnetic field which is modulated in accordance with the recording information is applied from the magnetic head element 115 while the magnetic head slider 114 slides on the disk surface, and at the same time, a light beam for recording is irradiated from the optical pickup 108, to thereby record information in the magnetooptical disk 100a.

Also, when the information is played back, a light beam for playback is irradiated onto the magnetooptical disk 100a from the optical pickup 108, and its reflected light is detected by a photo-sensor (not shown) within the optical pickup, and a given signal processing is conducted by using a detection signal from the photo-sensor, to thereby play back the recorded information.

As was described above, in this embodiment, because the position of the magnetic head portion is stabilized by using the elastic deformation of the elastic members 112a and 112b at the time of unloading, the locking mechanism of the magnetic head slider 114 is unnecessary at the time of unloading, and the structure can be simplified by that much, and the number of required parts can be reduced. For that reason, the assembling of the apparatus is facilitated, and the apparatus can be downsized and thinned because the locking mechanism is unnecessary.

In addition, since the elastic members 112a and 112b also serve as wirings that supply a drive current to the coil 115b, less wiring work becomes necessary in the periphery of the magnetic head portion, and the assembling of the apparatus can be simplified by that much.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A magnetooptical recording apparatus which records information by applying a magnetic field for recording from a magnetic head while irradiating a light beam onto a magnetooptical disk from an optical pickup, the apparatus comprising:

an optical pickup;

a magnetic head having a slider that moves in a radial direction of a magnetooptical disk together with the optical pickup and is abutted against a recording surface of the magnetooptical disk;

first and second elastic members that support the magnetic head, wherein a base end portion of the first elastic member is fixed to a given position of a substrate that supports the magnetic head, and wherein the first elastic member extends in a first direction from the position at which said base end portion is fixed, the second elastic member is folded with respect to the first elastic member to extend in a direction opposite to the first direction, wherein a base end portion of the second elastic member is fixed to the slider, and wherein a displacement of the magnetic head in the tangential direction due to vertical displacement of the magnetooptical disk is cancelled by displacements which are respectively caused by the first and second elastic members and act in mutually opposite directions; and an ascending and descending mechanism for loading and unloading the magnetic head, wherein at the time of unloading, a joint portion of the first and second elastic members is retained on the substrate so that the first elastic member is bent in an arc-shape and the second elastic member is deformed so as to lie substantially on the same plane as the substrate surface, to thereby stabilize a position of the magnetic head at the time of unloading.

2. The magnetooptical recording apparatus according to claim 1, wherein the ascending and descending mechanism comprises a slide plate that pushes and moves the first elastic member and moves the magnetic head up and down.

* * * * *

UNITED STATES PATENT AND TRADEMARK OFFICE
CERTIFICATE OF CORRECTION

PATENT NO. : 7,016,267 B2 Page 1 of 1
APPLICATION NO. : 10/231277
DATED : March 21, 2006
INVENTOR(S) : Kazunori Suzuki It is certified that error appears in the above-identified patent and that said Letters Patent is hereby corrected as shown below:

COLUMN 3

Line 27, "achieve" should read --achieves--; and
Line 31, "an" should read --a--.

COLUMN 7

Line 58, "Here," should read --Accordingly, as shown in in Figs. 9A and 9B, the first elastic member 112a extends in a first direction from its fixed end, the outer end of the first elastic element is coupled to the second elastic member at 130, the second elastic member is folded back with respect to the first elastic member to extend in a direction opposed to the first direction, and the outer end of the second elastic member is connected to the magnetic head portion. Here,--; and
Line 67, "as a" should read --to cause a potential--.

COLUMN 8

Line 2, "as a" should read --to cause a potential--;
Line 4, "displacement" should read --potential displacement--; and
Line 6, "amounts" should read --displacements--.

Signed and Sealed this

Nineteenth Day of September, 2006

JON W. DUDAS
*Director of the United States Patent and Trademark Office*